United States Patent [19]

Harrington

[11] Patent Number: 5,493,323
[45] Date of Patent: Feb. 20, 1996

[54] COLOR IMAGES HAVING MULTIPLE SEPARATIONS WITH MINIMALLY OVERLAPPING HALFTONE DOTS

[75] Inventor: Steven J. Harrington, Holley, N.Y.

[73] Assignee: Xerox Corporation, Stamford, Conn.

[21] Appl. No.: 102,329

[22] Filed: Aug. 5, 1993

[51] Int. Cl.$^6$ ............................................. H04N 1/21
[52] U.S. Cl. ............................................. 347/251; 358/298
[58] Field of Search ............................................. 347/131, 240, 347/246, 251, 282; 358/298, 456, 453, 458

[56] References Cited

U.S. PATENT DOCUMENTS

| | | | |
|---|---|---|---|
| 4,149,194 | 4/1979 | Holladay | 358/283 |
| 4,275,413 | 6/1981 | Sakamoto et al. | 358/80 |
| 4,507,685 | 3/1985 | Kawamura | 358/283 |
| 4,620,198 | 10/1986 | Behun | 346/75 |
| 4,899,181 | 2/1990 | Hawkins | 346/140 R |
| 5,153,609 | 10/1992 | Ando et al. | 347/246 |
| 5,253,084 | 10/1993 | Rylander | 358/465 |
| 5,331,429 | 7/1994 | Levein | 358/456 |

FOREIGN PATENT DOCUMENTS

| | | |
|---|---|---|
| 0204094 | 12/1986 | European Pat. Off. . |
| 0444290 | 9/1991 | European Pat. Off. . |
| 0533593 | 3/1993 | European Pat. Off. . |
| 3606427 | 8/1986 | Germany . |

OTHER PUBLICATIONS

Po–Chieh Hung, "Tetrahedral Division Technique Applied to Colorimetric Calibration for Imaging Media", Annual Meeting IS&T, N.J., May, 1992, pp. 419–422.

Po–Chieh Hung, "Colorimetric Calibration for Scanners and Media", SPIE, vol. 1448, Camera and Input Scanner System (1991).

Sigfredo I. Nin et al, "Printing CIELAB Images on a CMYK Printer Using Tri–Linear Interpolation", SPIE Proceedings, vol. 1670, 1992, pp. 316–324.

Primary Examiner—Mark J. Reinhart
Attorney, Agent, or Firm—Mark Costello

[57] ABSTRACT

Halftone screens are generated for each separation in accordance with the goal of avoiding overlapping whenever possible. Initially, the black separation is halftoned, generating a dot with a number of ON pixels and OFF pixels in accordance with the area density of the black separation. Next, a first color separation is halftoned, setting a number of the previous OFF pixels to ON. Then, if any white pixels remain, the second color separation is halftoned, setting a number of the previously OFF pixels to ON. After the second color separation is halftoned, if any OFF pixels remain, the third color separation is halftoned, setting a number of the previous OFF pixels to ON. If during the processing of the second and third separations, it is determined that no OFF pixels exist to be turned ON, second and third layers of color is started, respectively superimposed over the first layer and then, if required, superimposed over the second layer. Each layer is started and arranged so that the additional colors forming the dot are not placed on any black areas.

13 Claims, 7 Drawing Sheets

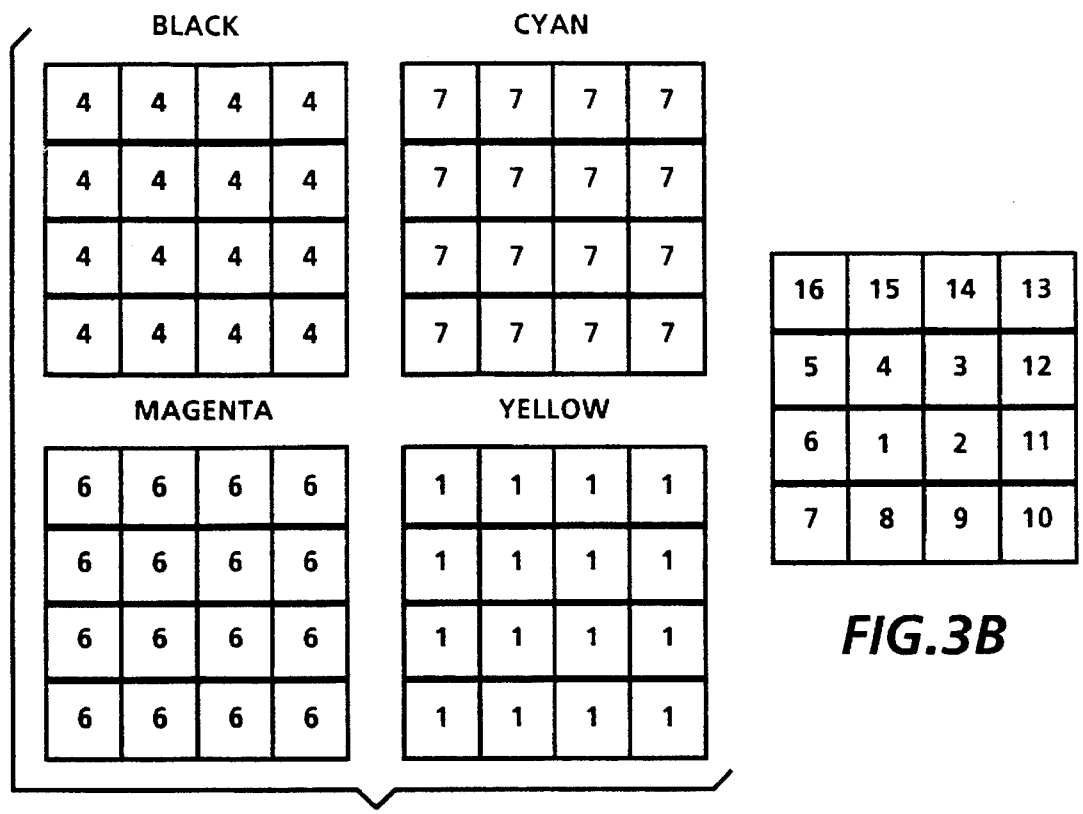
*FIG.3A*
*FIG.3B*
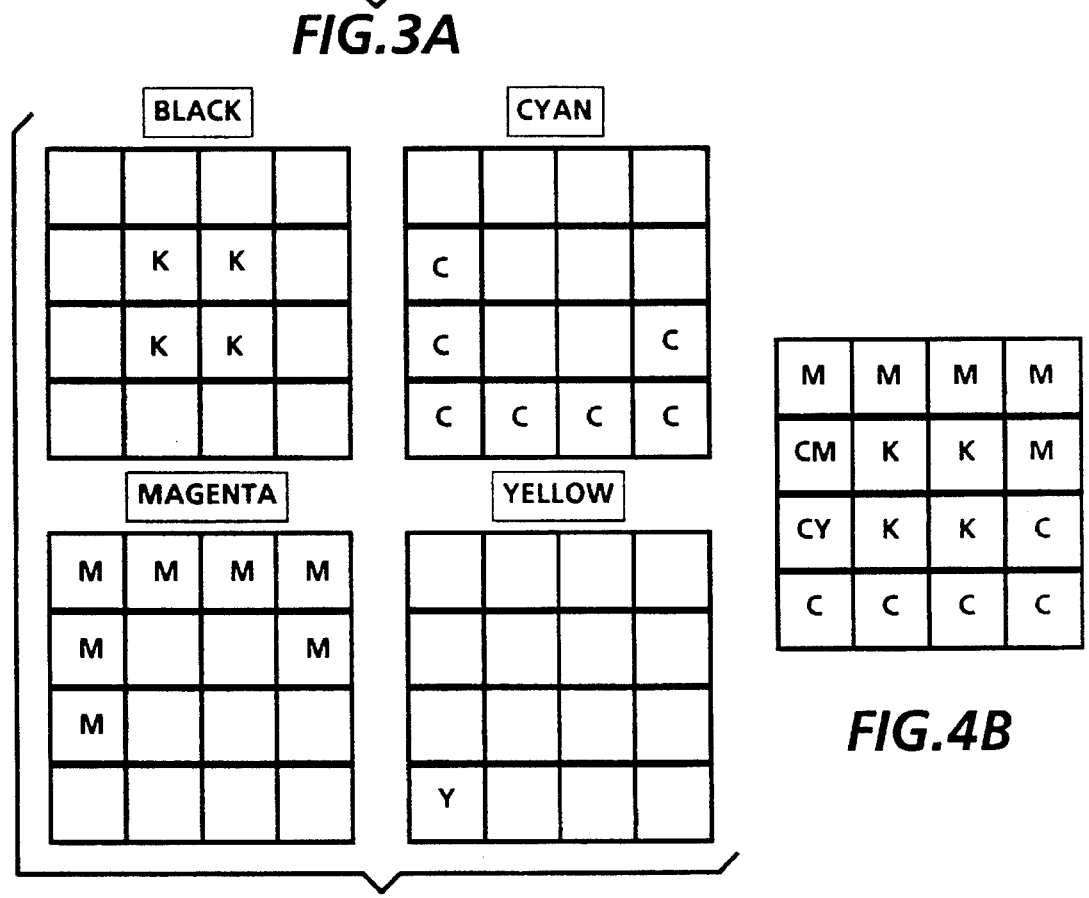
*FIG.4A*
*FIG.4B*

COLOR IMAGES HAVING MULTIPLE SEPARATIONS WITH MINIMALLY OVERLAPPING HALFTONE DOTS

This invention relates to binarization of multiple separation contone color images, and more particularly methods for assuring that from separation to separation, overlap of separation halftone dots is minimized.

BACKGROUND OF THE INVENTION

Color images are commonly represented as a one or more separations, each separation comprising a set of color density signals for a signal primary or secondary color. The color density signals are commonly represented as digital gray or contone pixels, varying in magnitude from a minimum to a maximum, with a number of gradations between corresponding to the bit density of the system. Thus, a common 8 bit system provides 256 shades of each primary color. A color can therefore be considered the combination of magnitudes of each pixel, which when viewed together, present the combination color. Usually, printer signals include three subtractive primary colors (cyan, magenta and yellow) signals and a black signal, which together can be considered the printer colorant signals. Each color signal forms a separation, and when combined together with the other separations forms the color image.

Printers commonly provide a limited number of output possibilities, and are commonly binary, i.e., they produce either a spot or no spot at a given location (although multilevel printers beyond binary are known). Thus, given a color separation with 256 shades of each additive primary color, a set of binary printer signals must be produced representing the contone effect. In such arrangements, over a given area in the separation having a number of contone pixels therein, each pixel value of an array of contone pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is a contone, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data.

Thus, it can be seen that several spots together form a halftone dot. These dots are carefully designed to system requirements, so that the system optimally reproduces the image. In electrophotographic systems, which have great difficulty in reproducing isolated spots (e.g. a black spot surrounded by white spots), the dot is designed so that increasing densities produce an increasing number of black spots clustered together. By contrast, ink jet printing produces isolated dots reasonably well, and so the requirement of clustering can be relaxed in favor of other requirements.

In electrophotographic systems, with the clustered dot requirement, registration between separations is difficult to achieve. Accordingly, since minor registration errors would result in the development of undesirable moire patterns, the screens of each separation are rotated with respect to other another, as in the above described reference to Holladay. In current ink jet printers which have very good separation to separation registration, moire patterns are not a problem. Accordingly, the dots can be placed in registration, one on top of the other.

Given that reduction in the above constraints, other goals can be addressed to optimize system reproduction, one of which is the maximization of gamut of the color printer. Because inks are not ideal, the color produced by two ink dots laid on top of one another is different from the color produced by the placement of the dots in side by side relationship. The greatest gamut is produced in the latter case, when overlap of inks is minimized.

A second goal of dot design is to improve edge definition. Edges, characterized by abrupt changes in color or density within a small area of the image, are well defined in the inked portion of a halftone dot, but are lost in white areas between dots. The amount of white space will be larger as the separations which contribute to the color at the edge are formed with overlapping dots. However, if separations forming the edge contribute to the color combination with dots in side by side relationship, there would be less white space, and a greater chance that an edge would overlap one of the side by side dots, providing improved edge rendition.

A third goal of dot design is to decrease local concentrations of ink. Problems such as puddling or bleeding of ink occur if there is to much ink within a small area. It would be preferable to have a uniform layer of a moderate amount of ink rather than areas of heavy coverage mixed with areas of no coverage at all.

All of the references cited herein are incorporated by reference for their teachings.

SUMMARY OF THE INVENTION

In accordance with the invention, there is provided a method of preparing a color document initially defined in terms of contone image signals to binary image signals, using a halftoning process that minimizes overlap of colors within a halftone dot area.

In accordance with the invention, halftone screens are generated for each separation in accordance with the goal of avoiding overlapping whenever possible. Initially, the black separation is halftoned, generating a dot with a some number of ON pixels and OFF pixels in accordance with the area density of the black separation. Next, a first color separation is halftoned, setting a number of the previous OFF pixels to ON. Then, if any white pixels remain, the second color separation is halftoned, setting a number of the previously OFF pixels to ON. After the second color separation is halftoned, if any OFF pixels remain, the third color separation is halftoned, setting a number of the previous OFF pixels to ON. If during the processing of the second and third separations, it is determined that no OFF pixels exist to be turned ON, second and third layers of color is started, respectively superimposed over the first layer and then, if required, superimposed over the second layer. Each layer is started and arranged so that the additional colors forming the dot are not placed on any black areas.

The way in which this placement of the spots within the separation dots is achieved is by adding the magnitude of previously placed colors to the color currently being placed, so that when compared to the halftone threshold, the pixel is set to ON "beyond" the previously placed pixels in other separations (at higher thresholds than would be exceeded given the magnitude of the image signals). The summed magnitude is also compared to the maximum threshold for the system, so that any excess pixels may be carried to a second or third layer of color. To avoid printing over black, the second and third layers are started after any black pixels.

These and other aspects of the invention will become apparent from the following descriptions to illustrate a preferred embodiment of the invention read in conjunction with the accompanying drawings in which:

FIG. 1 is a schematic illustration of pertinent elements of a scan to print system in which the present invention may find use;

FIG. 2 schematically illustrates the generation of printer colorant signals, on which the present invention operates;

FIG. 3A shows a set of sample areas from plural separations, and FIG. 3B shows a simple 4×4 halftone cell of threshold values;

FIG. 4A shows a set of dots derived from the sample areas and halftone cell of FIGS. 3A and 3B, while FIG. 4B shows their arrangement in overlapping or printed relationship.

Figure 1:
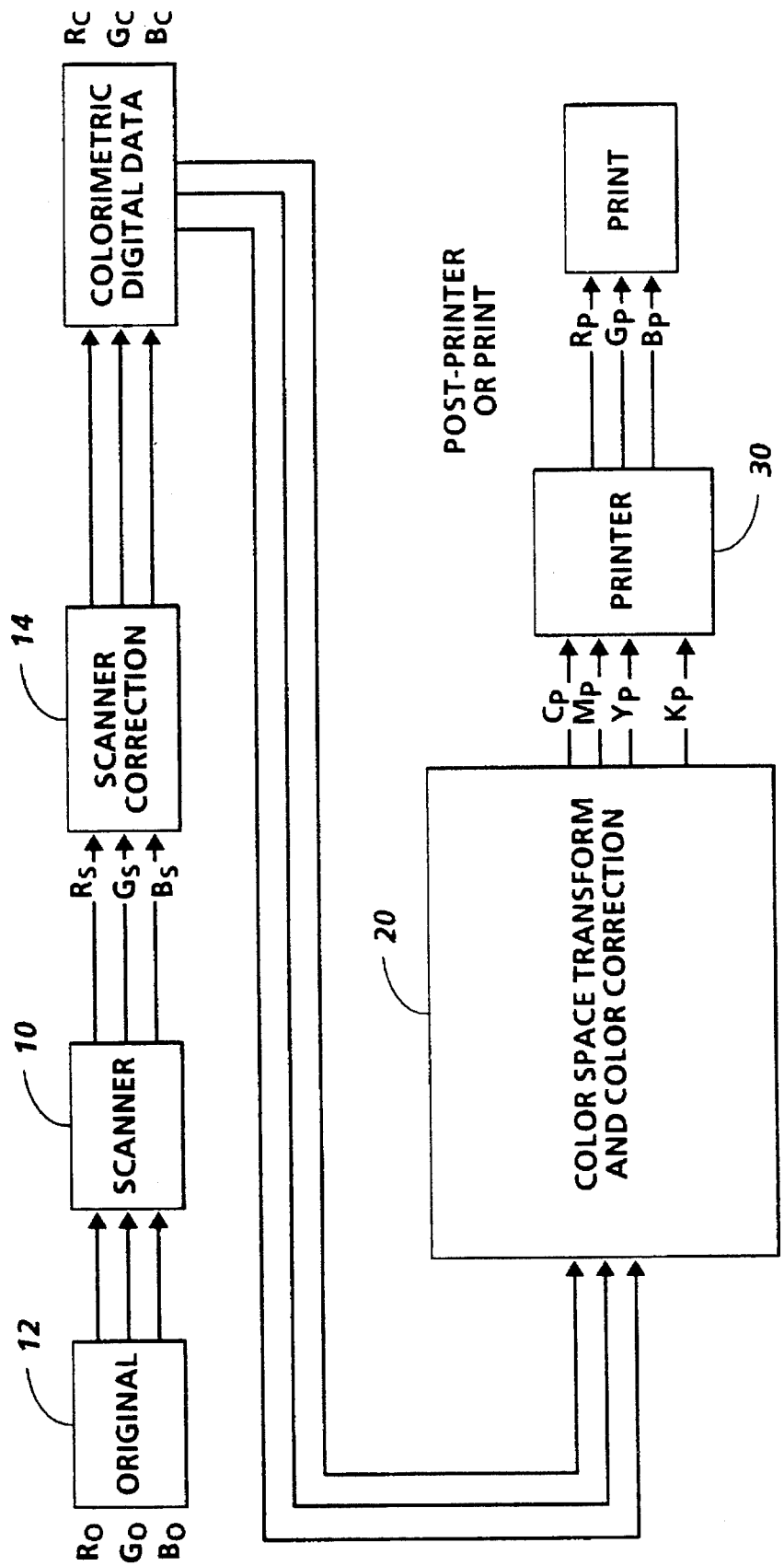

Referring now to the drawings where the showings are for the purpose of describing an embodiment of the invention and not for limiting same in the particular color system to be discussed, color documents are represented by multiple sets of image signals, each set (or separation) represented by an independent channel, which is processed more or less independently. A "color image" as used herein is therefore a document including at least two, and commonly three or four separations, each separation providing a set of image signals which will drive a printer to produce one color of the image, which separations together form the full color image. In this context, we will describe pixels as discrete image signals, which describe optical density of the document image in a given small area thereof. The term "pixel" will be used to refer to such an image signal in each separation.

One suitable printing system might be a color ink jet printer, such as the devices described in U.S. Pat. No. 4,620,198 and 4,899,181, which describes two color ink jet printers. Referring now to the drawings where the showings are for the purpose of describing an embodiment of the invention and not for limiting same, a basic system for carrying out the present invention is shown in FIG. 1. In a simple system model, a scanner 10, which can be calibrated to produce a set of digital colorimetric or device independent data describing a scanned image 12, which, by definition can be defined in terms of r g b space. Resulting from the scanning operation is a set of scanner image signals $R_s$, $G_s$, $B_s$, defined in device dependent scanner terms. Incorporated into the scanner or another processing path is a post-scanning processor 14, which provides correction of scanner image signals $R_s$, $G_s$, $B_s$ to colorimetric terms, typically digital in nature $R_c$, $G_c$, $B_c$. The values may be in terms of CIE color space (rgb), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values $C_p$, $M_p$, $Y_p$, $K_p$ that will be used to drive a printer 30. In one possible example, the colorant values represent the relative amounts of cyan, magenta and yellow toners that are to be deposited over a given area. The printed output image may be said to be defined in terms of $R_p$, $G_p$, $B_p$, which is hoped to have a relationship with $R_o$, $G_o$, $B_o$ such that the printer has a color that is colorimetrically similar to the original image, although that similarity is ultimately dependent upon the gamut of the printing device.

Figure 2:
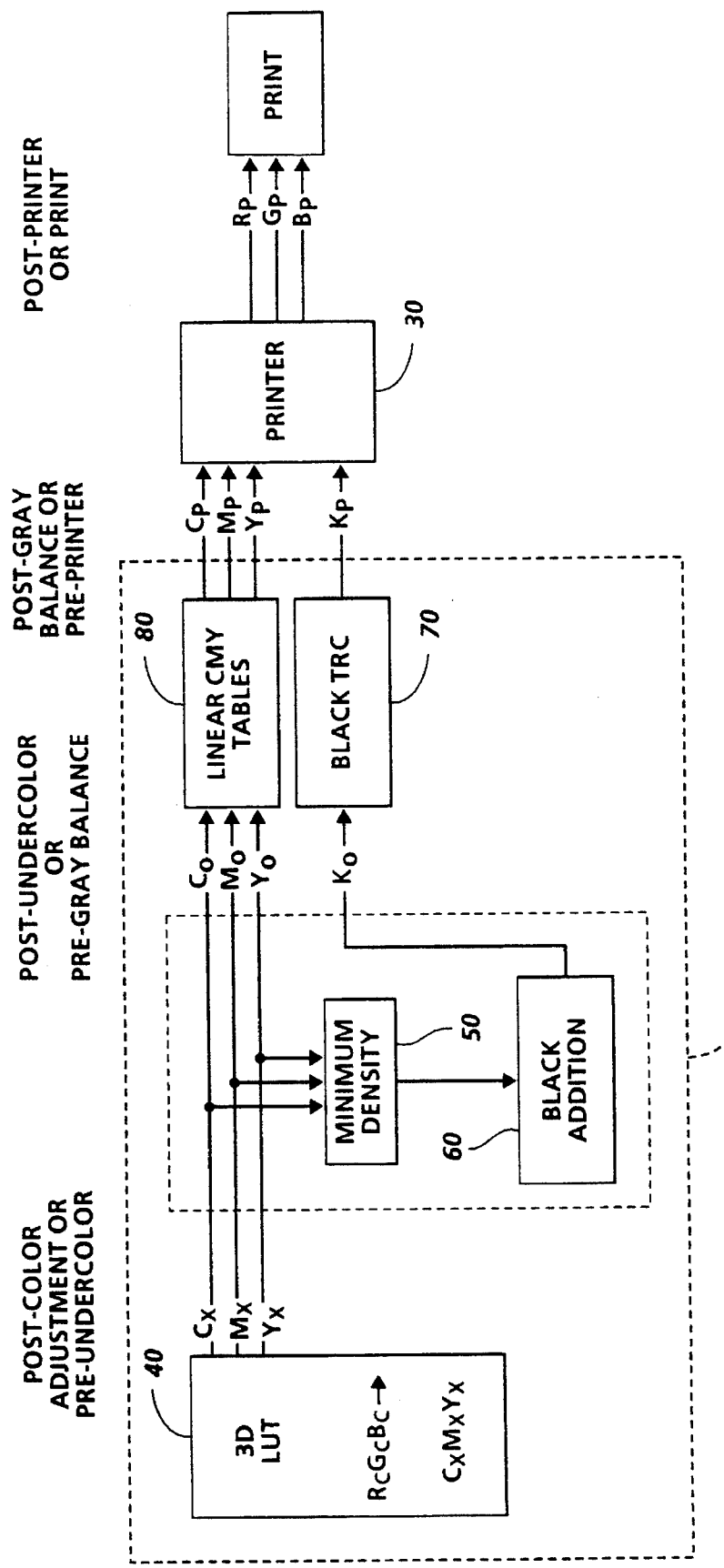

With reference now to FIG. 2, and color space transformation and color correction 20, initially, $R_c$, $G_c$, $B_c$ color signals are directed to a three dimensional look up table stored in a device memory such as a ROM or other addressable memory device, which will meet speed and memory requirements for a particular device. Color signals $R_c$, $G_c$, $B_c$ are processed to generate address entries to the table which stores a set coefficients with which the $R_c$, $G_c$, $B_c$ may be processed to convert them to $C_x$, $M_x$, $Y_x$ colorant signals. Values which are not mapped may be determined through interpolation.

There are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324. The construction of the set of values stored for the present invention will be discussed hereinbelow.

With reference to FIG. 2, upon obtaining device dependent colorant signals $C_x$, $M_x$, $Y_x$, black addition (K+) is performed in two steps. In the first step 50 the minimum density of the cyan, magenta, and yellow signals is determined. In the second step 60 it then generates a black colorant signal as a function thereof. The addition of black ink is primarily an aesthetic determination.

Subsequent to black addition, the color values are linearized, so that linearly increasing values of colorants produce a linearly increasing colorimetric response. The linearization process is implemented via a set of look-up tables storing the responses of a set of patches generated at a set of input values, where a curve fitting routine is used to map the set of possible input responses to characterized output responses. These values are then used to drive printer 30.

Accordingly, in one embodiment of the invention, a set of image signals are derived representing the cyan, magenta, yellow and black separations. FIGS. 3A, 3B, 4A and 4B, illustrate the principle operation of the invention. Four separation signals representing the black, cyan, magenta and yellow separations are represented in FIG. 3A, with the possible densities shown. In the example, uniform densities are shown, although, the invention contemplate partial dotting as well.

For the purposes of simplicity, a 4 bit system is assumed, with 17 possible densities 0 to 16, and a 4×4 halftone cell is assumed, with the thresholds varying from 1 16 through the screen as shown in FIG. 3B. FIG. 4A illustrates the output response of the thresholding process, which produces a dot for each separation consisting of spot at location where the contone image signal exceeded the threshold value. The described method establishes the positions of the black spots initially, and then places the colored spots for each separation in locations within the cell that do not overlap the black spots. FIG. 4B shows the 4 dots as they be printed, with the little overlap occurring, and limited to the color portions of the dot.

The way in which this placement of the spots within the separation dots is achieved is by adding the magnitude of previously placed colors to the color currently being placed, so that when compared to the halftone threshold, the pixel is set to ON "beyond" the previously placed pixels in other separations (at higher thresholds than would be exceeded given the magnitude of the image signals). The summed magnitude is also compared to the maximum threshold for the system, so that any excess pixels may be carried to a second or third layer of color. To avoid printing over black, the second and third layers are started after any black pixels. This may be better shown by the procedure which actually carries the process out, expressed in pseudo code.

```
Halftone (c,m,y,k,i,j)
{int t = threshold(i,j)}
if(k> = t) kout(i,j,1); else kout (i,j,0);       /*set black result
m = m + k                                         /*move magenta
                                                   past black
if((m> = t) && (k<t)) mout (i,j,1);              /*set magenta result
else mout (i,j,0); c = c + m                     /*move cyan past
                                                   black
if((c> = t) && (m<t)) cout(i,j,1);               /*set cyan result
else cout (i,j,0); y = y + c                     /*move yellow past
                                                   cyan
if((y> = t) && (c<t)) yout(i,j,1);               /*set yellow result
else yout(i,j,0);                                /*second layer
if(c>maxval) c = c-maxval + k; else c = k        /*second layer
if(y> maxval) y = y-maxval + k;                  /*amount of cyan
else y = k (or 0)                                /*second layer
if((c> = t) && (k<t)) cout(i,j,1);               /*amount of yellow
else cout (i,j,0);                               /*set second layer
if((y> = t) && (c<t)) yout(i,j,1);                cyan after black
else yout (i,j,0);                               /*set second layer
if(y>maxval) y = y-maxval + k;                    yellow after cyan
else y = k (or 0)                                /*third layer of
if((y> = t) && (k<t)) yout(i,j,1);                yellow
else yout (i,j,0);                               /*set third lazer
                                                  yellow after black
```

This procedure takes in color values for cyan, magenta, yellow and black at a pixel (c, m, y, k) and pixel position (i, j) (where i is the pixel position in the scan line, and j is the scan line position in a page). It makes use of a standard halftone threshold procedure threshold(i,j) which produces a threshold for the pixel at position i, j. The result of the halftone process is conveyed by setting the output value v of each separation to 0 (no ink) or 1 (ink) via the procedures cout(i, j, v), mout (i, j, v) yout(i, j, v) kout (i, j, v). The maximum value possible within the system is maxval.

The assumptions are made that the cyan, magenta, yellow and black ink amounts are the amounts which should actually be seen. In particular, it assumes that the amount of black plus that of any other color never exceeds the maximum ink value (i.e., there never needs to be overlap of black with any other color. The procedure also places inks in the order magenta, cyan, yellow (darkest to lightest) in order to best preserve the halftone shape, but other orderings are possible. It is also possible to provide less than four separations, and to provide a system without a black separation.

Figure 5:
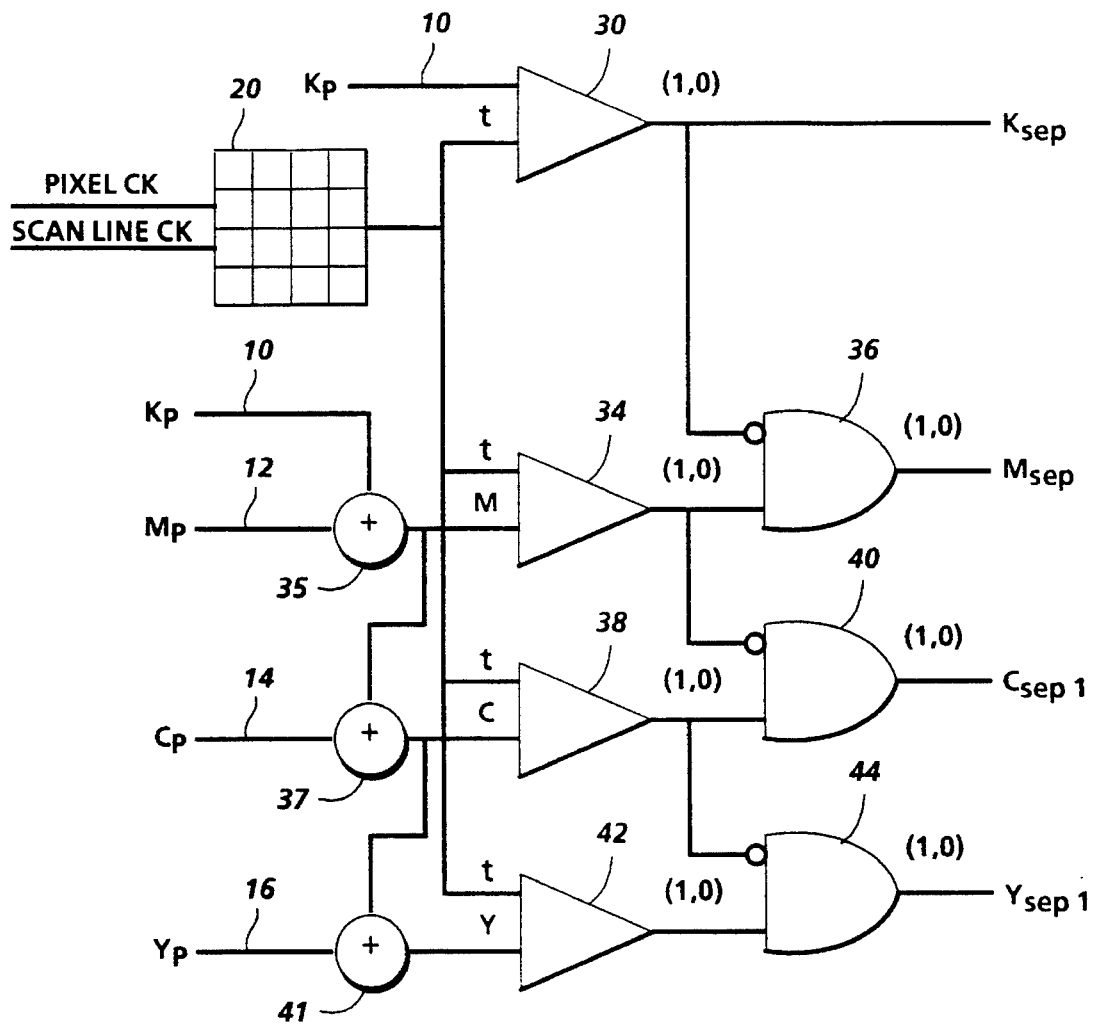
FIGS. 5, 6, 7 and 8A and 8B together illustrate a functional block diagram of a system for accomplishing the present invention.

With reference now to FIG. 5, a block diagram of the proposed system is shown. Within printer 30 is found the inventive halftoning apparatus. Accordingly, a set of separation image signals $K_p$, $M_p$, $C_p$ and $Y_p$ are received by the halftoning system at inputs 10, 12, 14, and 16. Stored in printer memory 20, which can be ROM and RAM type memory, is a halftone cell for the particular halftoning application, in this case illustrated as a simple 4×4 array. The halftone cell provides threshold values t against which each separation image signal will be compared. Appropriate threshold values for a given location i,j in the image are returned based on the pixel clock and scan line clock signals directed to memory 20. The halftone cell memory returns a value t responsive to the appropriate clock signals.

Initially t(i,j) is directed to comparator 30, which has as a second input black separation signal $K_p$. The output of comparator 30 depends on whether $K_p$ is greater than t(i,j). If it is, it returns a signal $K_{sep}$ indicating that case, in the current example a 1 or 0, which will cause the printer to place a spot or no spot at position i,j when it is printing the black separation.

The same pixel clocking also directs t(i,j) to comparator 34. Comparator 34 has as a second input the sum of signals $K_p$ and $M_p$ from signal adder 35, which serve to increase the magnitude of signal $M_p$, if signal $K_p$ has a non-zero value. Accordingly, signal $M_p$ will exceed a higher threshold than otherwise would be the case. The output of comparator 34 depends on whether signal $K_p$ is greater than t(i,j). If it is, it returns a signal $M_{sep}$ indicating that case, in the current example a 1 or 0, in the case of the magenta separation halftoning, the output is also pairwise logically ANDed at AND gate 36 with the output of comparator 34, to assure that the magenta pixel that is printed will not overlap a black pixel.

In like manner, t(i,j) is directed to comparators 38 and 42, which have as second inputs the sum of $M_p$ and $C_p$ and the sum of $C_p$ and $Y_p$ from adders 37 and 41, respectively. The outputs of each comparator 38 and 42 are pairwise logically ANDed at AND gates 40 and 44 with the outputs of comparator 34 and 38, respectively, to assure that the cyan pixel and yellow pixels are not printed over the magenta or cyan pixels, respectively. The output signals Csep and Ysep result, if the determined pixels fit in the first layers.

Figure 6:
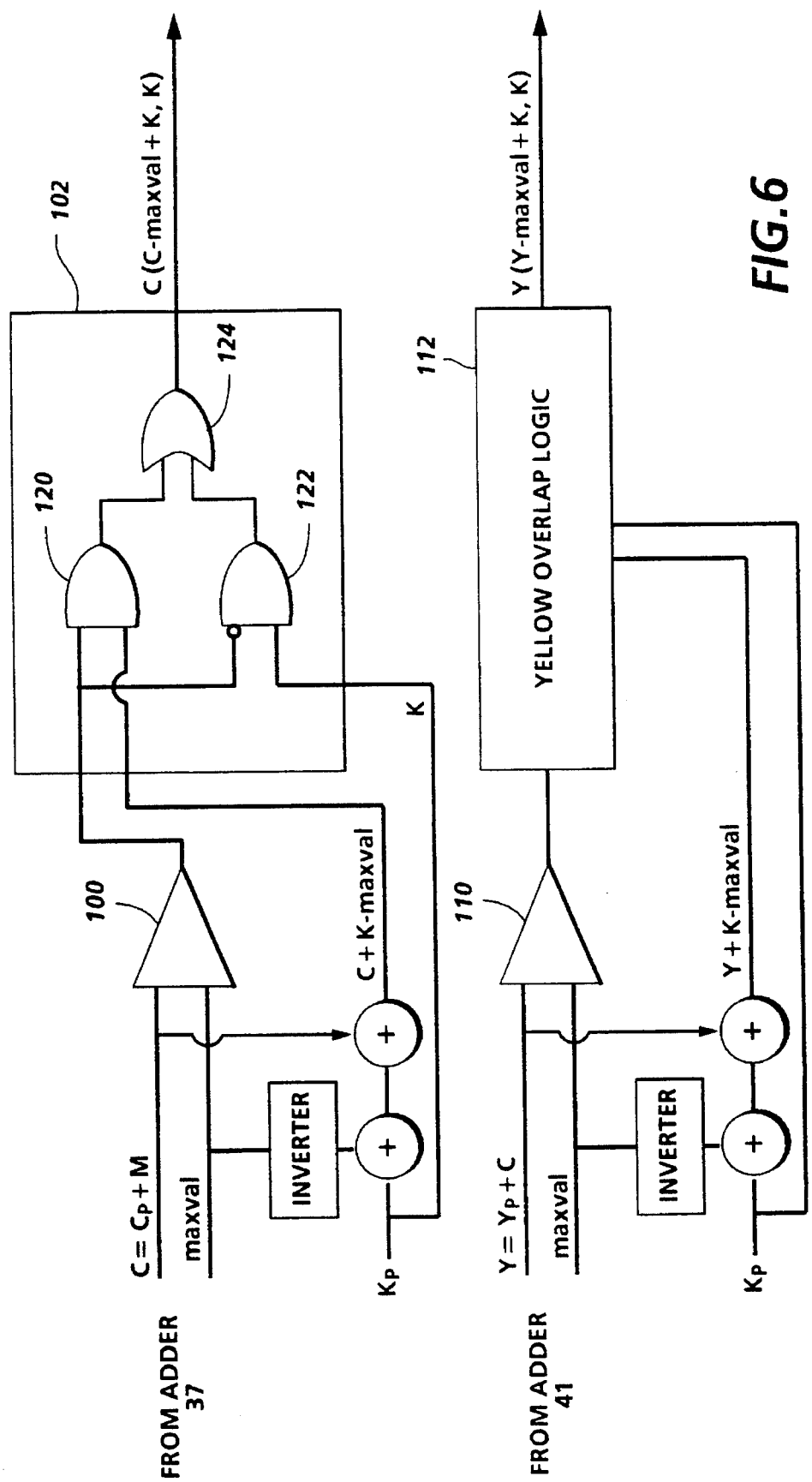

With reference now to FIG. 6, it will be understood that certain colors will only be created by providing a number of color separation pixels that require overlap. Accordingly, FIG. 6 describes logic for determining whether overlap is required. From adder 37 of FIG. 5, C is compared at comparator 100 to the maximum pixel value maxval within the system. At cyan overlap logic 102, a determination is made as a result of the comparison that if C is greater than maxval, then logic 102 outputs the value C−maxval+ k. This resets the value of C so that it will turn on threshold levels starting just after black. If C is less than maxval, output C is set to $K_p$. The implication of which will become apparent in reviewing FIG. 7. Logic 102 included an AND gate 120 having as inputs the output of comparator 100, a C+ (K−maxval), and an AND gate 122 having as inputs the compare signal, inverted, and k. The outputs of AND gates 120, 122 logically ORed at OR gate 124 to provide the required output.

A similar arrangement is provided for the yellow separation. From adder 41 in FIG. 5, Y is compared at comparator 110 to the maximum pixel value maxval within the system. At yellow overlap logic 112, a determination is made as a result of the comparison that if Y is greater than maxval, then logic 102 outputs the value Y−maxval+ k. This resets the value of Y so that it will turn on threshold levels starting after black. If Y is less than maxval, output Y is set to $K_p$.

It will be understood that the arrangement for determining overlap will not be required for the magenta separation. There should not be any need for a second layer of the first ink, as placing ink over itself should not result in a color change.

Figure 7:
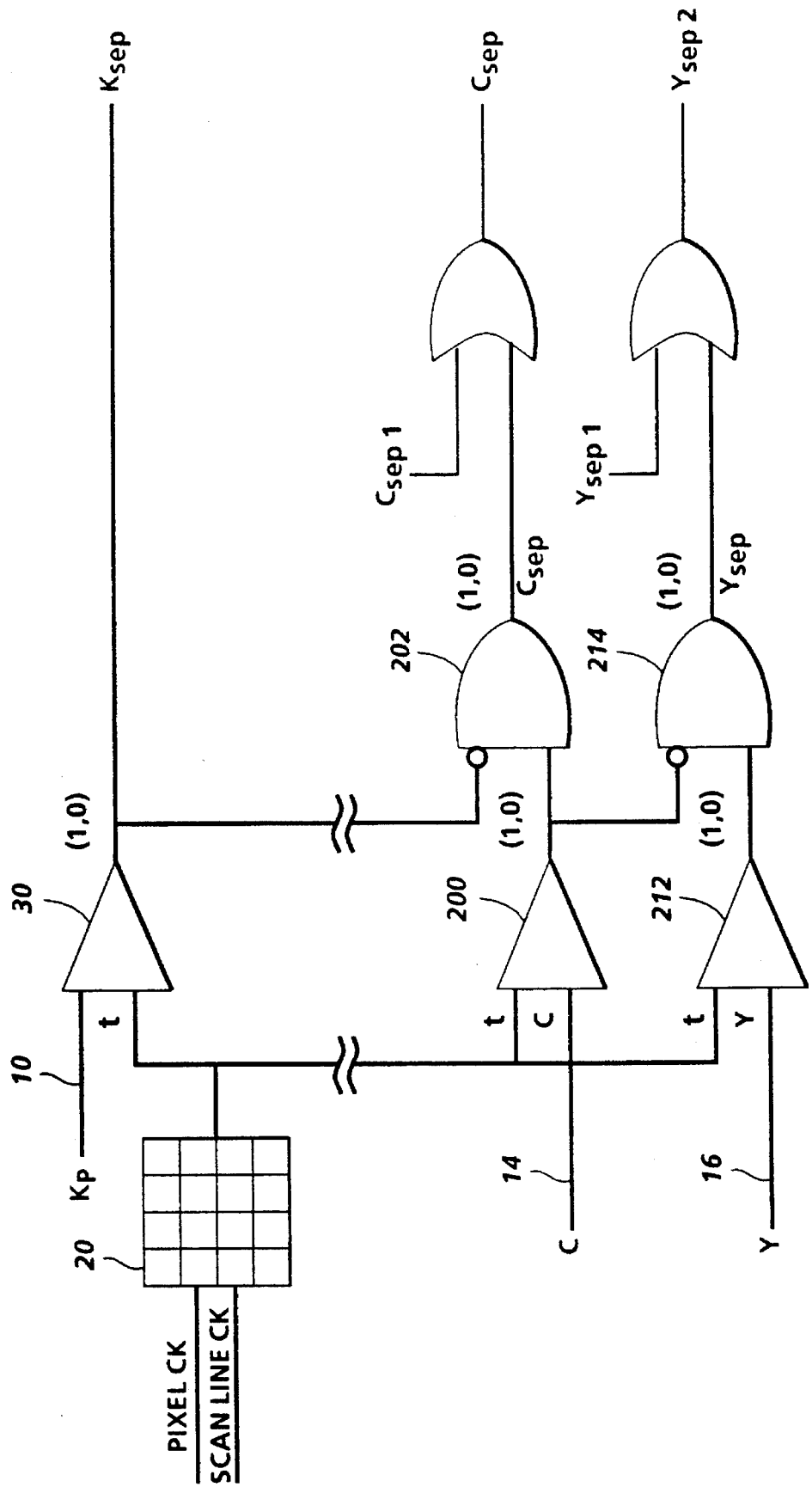

With reference now to FIG. 7, second layer halftoning is provided, substantially the same as the first layer, but without the magenta comparator. Signal t(i,j) is directed to comparators 200 and 212, which have as second inputs signal C and Y from logic 102 and 112, respectively. The outputs of each comparator 200 and 202 are pairwise logically ANDed at AND gates 202 and 214 with the outputs of comparator 30 and 200 respectively, to assure that the cyan pixel and yellow pixels are not printed over the black or cyan pixels, respectively. The output signals Csep and Ysep result, if the determined pixels fit in the second layers. It will be noted that if C or Y had been set to $K_p$, the output of comparator 34 and 200 or 202 would be the same, and the output of AND gates 202 and 214 would go to 0.

Figure 8A:
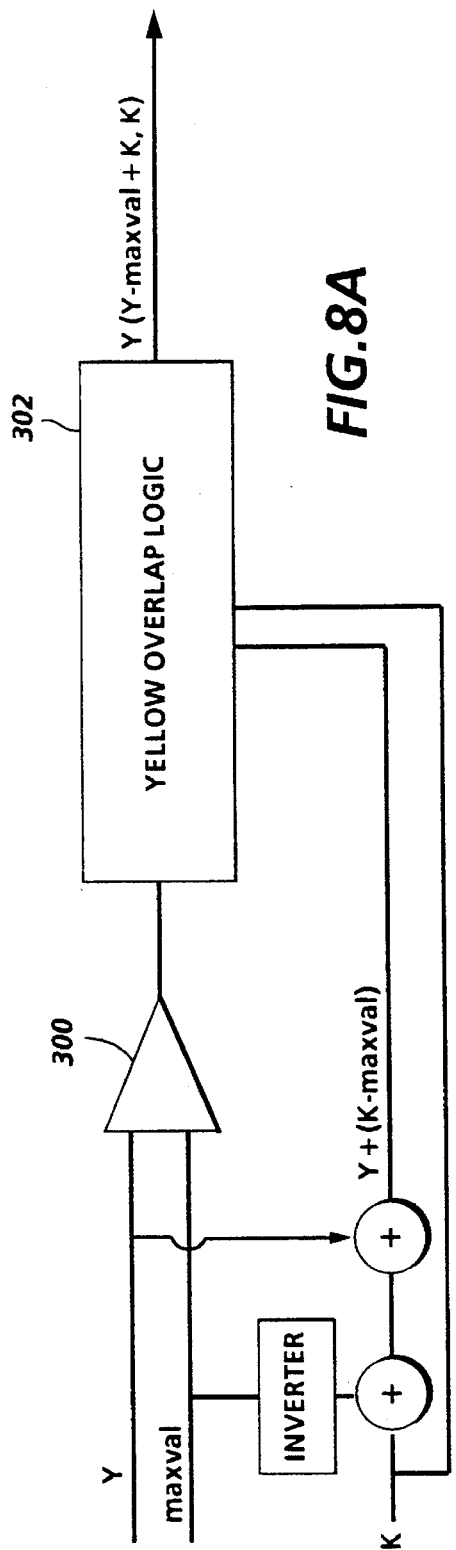
Figure 8B:
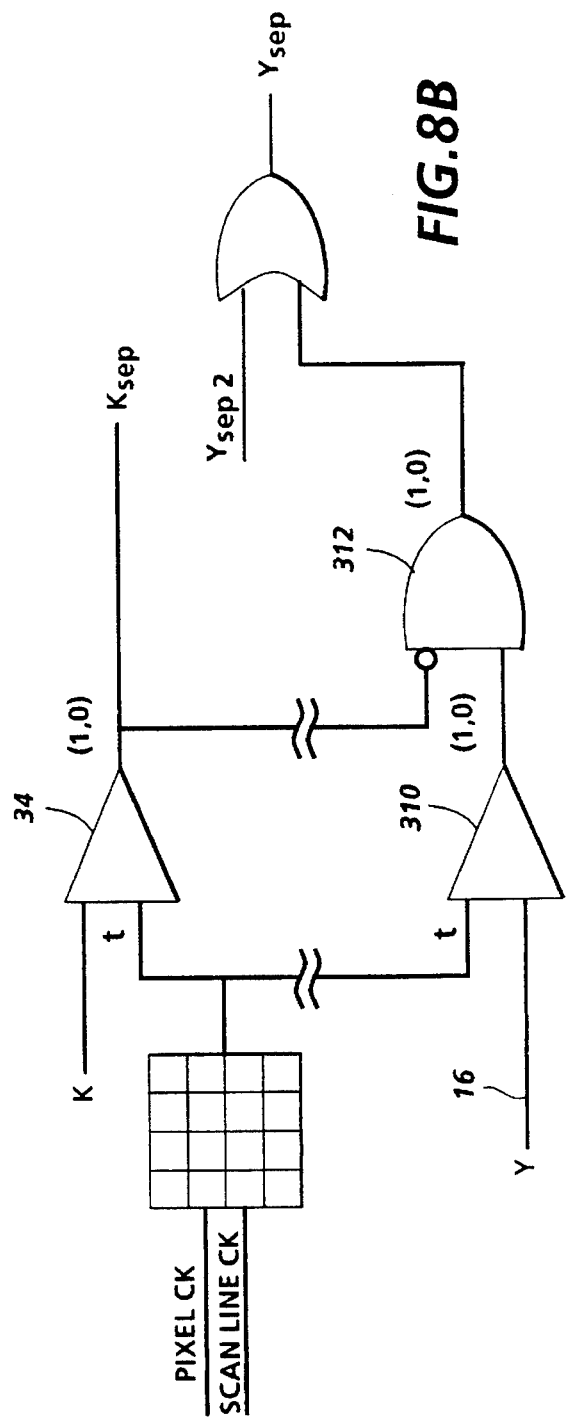

Third layer determination is shown in FIGS. 8A and 8B, where the Y output of logic device 112 is compared at comparator 300 to the maximum pixel value maxval within the system. At yellow overlap logic 302, essentially identical to logic 102, a determination is made as a result of the comparison that if Y is greater than maxval, then logic 302 outputs the value Y−maxval+ $K_p$. This resets the value Y so that it will turn on threshold levels starting just after black. At FIG. 8B, third layer halftoning is provided, substantially the same as the second layer halftoning, but without the cyan comparator. Signal t(i,j) is directed to comparators 310, which have as a second input signal Y from logic 302. The output of comparator 310 is pairwise logically ANDed at AND gates 312 with the outputs of comparator 34, to assure that the yellow pixel is not printed over the black pixels, respectively. The output signals Ysep results. It will be noted that if Y had been set to $K_p$, the output of comparator 34 and 310 would be the same, and the output of AND gates 312 would go to 0.

In many color systems, there is no black separation, in which case, the present halftoning system would be altered to operate without the black separation.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. An image processing system for a multicolor printer, including a halftone generator that converts contone separation signals to binary separation signals comprising:

means for receiving a plurality of contone separation signals;

means for storing a halftoning screen, having an m×n array of thresholds to be applied to a corresponding m×n array of contone image signals to derive a binary image signal suitable to drive a printer;

means for converting the contone signals for a black separation, if any, into black separation binary image signals in accordance with the threshold value corresponding to said signals, said converting means directing those black separation binary image signals signals to the printer upon completion;

means for converting contone signals for a first non-black separation into first non-black separation binary image signals, in accordance with the threshold value corresponding to said signals, said converting means directing the first non-black separation binary image signals to the printer upon completion, said means including offsetting means, adding the magnitude of any corresponding black separation contone signal to the magnitude of the first non-black separation contone signal; and a logic circuit, having as inputs the corresponding black separation binary signals and the first non-black separation binary image signal, and allowing the first non-black separation binary image signal to pass whenever the black separation binary signal indicates that black will not be printed;

means for converting the contone signals for any additional color separations into color binary signals suitable to drive a printer to print such color separations, said means including:

offsetting means, adding the magnitude of any previous contone separation signals to the magnitude of the color separation image signal;

a logic circuit, having as inputs the previous non-black separation binary signal and the color binary Signal, and allowing the color signal to pass whenever there is no previous non-black separation signal.

2. The device as described in claim 1, and including:

means for producing color binary signals for printing spots preferentially where black spots and first non-black color spots will not be printed, and overlapping first non-black color spots if required.

3. An image processing system for a multicolor printer, including a halftone generator that converts contone separation signals to binary separation signals comprising:

means for receiving a plurality of contone separation signals describing a color image;

means for storing a halftoning screen, having an m×n array of thresholds to be applied to a corresponding m×n array of contone image signals describing a discrete area of the image to derive a binary image signal suitable to drive a printer to produce spot or no spot at each of m×n locations within the discrete area;

means for producing first binary image signals describing a black separation, if any, from the contone separation signals, in accordance with the stored halftone screen thresholds, said separation describing a set of locations in the discrete area where black spots will be printed;

means for producing second binary image signals describing a first non-black color separation, from the contone separation signals, in accordance with the stored halftone screen, said second binary signals producing first non-black color spots at locations where black spots will not be printed;

means for producing third binary image signals, if any, describing a second non-black color separation, from the contone separation signals, in accordance with the stored halftone screen, said third binary signals producing second non-black color spots at locations where black spots will not be printed and preferentially where first non-black color spots will be not be printed, and overlapping first non-black color spots if required.

4. A method of preparing a color document defined in terms of contone image signals and multiple separations to binary image signals in multiple separations, using a halftoning process that minimizes overlap of colors within a halftone dot area, the method including the steps of:

storing a halftone screen cell in a memory device, the halftone cell defining for a discrete area of the image a set of 1 to N incrementally varying thresholds for use in producing binary image signals from the color document contone image signals;

receiving from a color image source black separation contone image signals, if any, for a discrete area of the image;

comparing each black separation contone image signal in the discrete area to a member of the set of 1 to N incrementally varying thresholds, and producing black separation binary image signals having a first state upon exceeding the threshold and a second state upon not exceeding the threshold;

directing the black separation binary image signals to the printer, whereby the printer is directed to print black spots or no black spots at each location within the discrete area;

receiving first color separation image signals, if any, for the discrete area of the image;

adding to each first color separation image signals the magnitude of the corresponding black separation image signals to produce an offset first color separation image signal;

comparing each offset first color separation image signal in the discrete area to a member of the set of 1 to N incrementally varying thresholds, and producing first color separation binary image signals having a first state upon exceeding the threshold and a second state upon not exceeding the threshold;

logically ANDing the first color binary image signals with inverse black binary image signals, and directing the logical output to the printer, whereby the printer is directed to print first color spots or no first color spots at each location within the discrete area where there is not already a black spot;

adding to any next color separation image signals the magnitude of the previous color separation image signals, if any;

comparing each next color separation image signal in the discrete area to a member of the set of 1 to N incrementally varying thresholds, and producing image signals having a first state upon exceeding the threshold level and a second state upon not exceeding the threshold whenever the threshold value is greater than the maximum previous color value;

logically ANDing the next color binary image signals with inverse previous color binary image signals, and directing the logical output to the printer, whereby the printer is directed to print next color spots or no next color spots at each location in the discrete area where there is not already a color spot; and determining that there is no location within the discrete area where there is not already a black spot or color spot, and directing the printer to print next color spots or no next color spots as required only at locations where there is a non-black spot.

5. In a color printing system, a method of printing a color document originally defined in terms of multi-bit signals describing color density received at a printer, the printer employing a halftone process which produces binary signals from the multi-bit signals to drive the printer to produce color spots, in accordance with color density within a halftone dot area, the steps of printing the color document at the printer including:

printing black spots, if any, within the halftone dot area, in accordance with the area density of black;

printing first separation spots within the halftone dot area at locations where there are no black spots, in accordance with the area density of the first color;

printing any next separation color spots within the halftone dot area at locations where there are no black spots, and preferentially at locations where there are no first separation spots, and overlaying the first separation spots if required by the area density of the next separation color.

6. A method of preparing an electronic color document for printing at a color printer, the documents defined in terms of digital contone image signals and multiple separations to be processed in a predetermined order, and the printer requiring binary printer driver signals in multiple separations, wherein the method minimizes overlap of colorants in the printer reproduction of the color document, including the steps of:

applying a binarization process to the digital contone image signals of a first separation to produce first separation printer driving signals;

for each remaining separation, generating a modified image signal from an original separation image signal and a modified image signal of a previously prepared separation;

applying the binarization process to the modified image signal of a following separation to obtain an intermediate binary signal for the second separation;

determining a printer driver signal for a first layer of the follow separation as a function of the intermediate binary signal for the following separation and the final binary signal for a previously prepared separation;

determining if additional layers of colorant are required to obtain the desired color at the printer;

for a next layer of a color separation, further modifying the modified image signal according to a maximum ink value and a modified image signal of a previously prepared separation;

applying the binarization process to the further modified signal to determine an intermediate binary value for the next separation layer;

determining a printer driver signal for the next separation layer as a function of the intermediate binary value for the layer and the final binary value for a previously prepared separation;

combining the binary signals for all layers of the separation to arrive at the overall binary signal for the separation;

directing the prepared separations to the color printer for printing.

7. The method as described in claim 6, where the binarization process is the comparison of an image signal value to a threshold signal associated with a position in the image, the binary signal being the result of the comparison.

8. The method as described in claim 6, where the modified image signal is the sum of the original separation signal and the modified image signal of any previous separation.

9. The method as described in claim 6, wherein the final binary value is computed as the logical AND of the intermediate binary signal and an inverse of the final binary signal for the previously prepared separation.

10. The method as described in claim 6, wherein the step of determining if additional layers of ink are required includes the step of comparing the modified image signal for a separation to a threshold signal.

11. The method as described in claim 6 wherein the further modification of the modified image signal value for an additional layer of ink includes the steps of:

subtracting the threshold value from the modified image signal; and if the colorant is to not overlap with the colorant of the first separation, adding the first separation signal value.

12. The method as described in claim 6 wherein the combination of the binary signals for all layers of the separation is a logical OR process operation of the final binary signals.

13. The method as described in claim 6 where the first color separation processed is black.

* * * * *